(12) United States Patent
Shniberg et al.

(10) Patent No.: US 7,203,367 B2
(45) Date of Patent: Apr. 10, 2007

(54) INDEXING, STORAGE AND RETRIEVAL OF DIGITAL IMAGES

(75) Inventors: Moti Shniberg, Elkannah (IL); Yaron Nemet, Kedumim (IL)

(73) Assignee: Imageid Ltd., Hod Hasharon (IL)

( * ) Notice: Subject to any disclaimer, the term of this patent is extended or adjusted under 35 U.S.C. 154(b) by 523 days.

(21) Appl. No.: 09/941,503

(22) Filed: Aug. 28, 2001

(65) Prior Publication Data

US 2002/0039447 A1    Apr. 4, 2002

Related U.S. Application Data

(60) Provisional application No. 60/228,963, filed on Aug. 29, 2000.

(51) Int. Cl.
  *G06K 9/62* (2006.01)
  *G06K 9/54* (2006.01)

(52) U.S. Cl. ...................... 382/224; 382/305

(58) Field of Classification Search ............... 382/103, 382/159, 181, 224–225, 278, 305, 118, 190, 382/306; 358/403; 707/1–10
See application file for complete search history.

(56) References Cited

U.S. PATENT DOCUMENTS

| | | | |
|---|---|---|---|
| 3,636,317 A | 1/1972 | Torrey ................. 235/61.12 N |
| 3,646,264 A | 2/1972 | Waugh ........................ 178/6.8 |
| 3,959,629 A | 5/1976 | Specht et al. ........ 235/61.12 N |
| 4,345,274 A | 8/1982 | Bambara .................... 358/108 |
| 4,858,000 A | 8/1989 | Lu .............................. 358/84 |
| 4,924,088 A | 5/1990 | Carman et al. ............. 250/271 |
| 5,587,906 A | 12/1996 | McIver et al. ........ 364/424.045 |
| 5,698,833 A | 12/1997 | Skinger ...................... 235/462 |
| 5,708,470 A | 1/1998 | Holford ....................... 348/61 |
| 5,764,790 A | 6/1998 | Brunelli et al. ............. 382/118 |
| 5,793,888 A | 8/1998 | Delanoy ...................... 382/219 |
| 5,802,208 A * | 9/1998 | Podilchuk et al. .......... 382/224 |
| 5,893,095 A | 4/1999 | Jain et al. ...................... 707/6 |
| 5,896,462 A | 4/1999 | Stern ........................... 382/306 |
| 5,899,999 A * | 5/1999 | De Bonet ................ 707/104.1 |
| 5,905,807 A | 5/1999 | Kado et al. .................. 382/118 |
| 5,911,139 A | 6/1999 | Jain et al. ...................... 707/3 |
| 5,914,477 A | 6/1999 | Wang ...................... 235/462.1 |
| 5,915,038 A | 6/1999 | Abdel-Mottaleb et al. .. 382/209 |

(Continued)

FOREIGN PATENT DOCUMENTS

WO    WO 00/04711    1/2000

OTHER PUBLICATIONS

Chang "Content-based indexing and retrieval of visual information", IEEE, pp. 45-48, 1997.*

(Continued)

*Primary Examiner*—Daniel Mariam
(74) *Attorney, Agent, or Firm*—Ladas & Parry LLP

(57) ABSTRACT

A method and a system for archiving, indexing and retrieving images of persons including the steps of providing image data relating to the images of persons to a suitably programmed computer, employing a first suitably programmed computer functionality to provide face recognition of the images, employing a second suitably programmed computer functionality to group the images according to faces recognized therein and employing a third suitably programmed computer functionality to provide an index of groups of the images organized according to faces recognized therein.

23 Claims, 8 Drawing Sheets

U.S. PATENT DOCUMENTS

| | | | | |
|---|---|---|---|---|
| 5,963,670 | A | 10/1999 | Lipson et al. | 382/224 |
| 5,978,507 | A | 11/1999 | Shackleton et al. | 382/195 |
| 6,006,231 | A | 12/1999 | Popa | 707/101 |
| 6,023,530 | A | 2/2000 | Wilson | 382/219 |
| 6,035,074 | A | 3/2000 | Fujimoto et al. | 382/282 |
| 6,085,195 | A | 7/2000 | Hoyt et al. | 707/10 |
| 6,088,482 | A | 7/2000 | He et al. | 382/202 |
| 6,091,836 | A | 7/2000 | Takano et al. | 382/118 |
| 6,108,437 | A | 8/2000 | Lin | 382/118 |
| 6,115,509 | A | 9/2000 | Yeskel | 382/309 |
| 6,142,375 | A | 11/2000 | Belka et al. | 235/454 |
| 6,164,541 | A | 12/2000 | Dougherty et al. | 235/462.01 |
| 6,263,113 | B1 | 7/2001 | Abdel-Mottaleb et al. | 382/237 |
| 6,381,346 | B1 * | 4/2002 | Eraslan | 382/118 |
| 6,396,963 | B2 * | 5/2002 | Shaffer et al. | 382/305 |
| 6,408,301 | B1 * | 6/2002 | Patton et al. | 707/102 |
| 6,418,235 | B1 | 7/2002 | Morimoto et al. | 382/118 |
| 6,446,865 | B1 * | 9/2002 | Holt et al. | 235/382 |
| 6,526,158 | B1 | 2/2003 | Goldberg | 382/115 |
| 6,546,185 | B1 * | 4/2003 | Kim et al. | 386/46 |
| 6,698,653 | B1 * | 3/2004 | Diamond et al. | 235/375 |
| 6,698,943 | B2 * | 3/2004 | Gluck | 396/427 |
| 6,771,875 | B1 * | 8/2004 | Kunieda et al. | 386/46 |
| 6,775,407 | B1 * | 8/2004 | Gindele et al. | 382/166 |
| 6,833,865 | B1 * | 12/2004 | Fuller et al. | 348/231.2 |

OTHER PUBLICATIONS

Oh, et al. "Content-based retrieval system for image using human face information", SPIE, vol. 3972.0277-786X, pp. 12-19, Jan. 2000.*

Ching, et al "Content-based Image retrieval", Hong Kong University of Science and Technology, pp. 1-41, 1999.*

Chang, et al. "Visual information retrieval from large distributed online repositories", ACM, pp. 63-71, 1997.*

Bach, et al. "A Visual information management system for the interactive retrieval of faces", IEEE, pp. 619-628, 1993.*

Wu "Content-based indexing of multimedia databases", IEEE, pp. 978-989, 1997.*

Kuchinsky, et al. "Fotofile: A Consumer multimedia organization and retrieval system", pp. 496-503, ACM 1999.*

Balasuriya "Frontal View Human Face Detection and Recognition", pp. 1-108, department of statistics and computer science, university of colombo, Sri Lanka, May 2000.*

* cited by examiner

INDEXING, STORAGE AND RETRIEVAL OF DIGITAL IMAGES

REFERENCE TO RELATED APPLICATIONS

This application is based on U.S. Provisional Patent Application No. 60/228,963 filed on Aug. 29, 2000.

FIELD OF THE INVENTION

The present invention relates to electronic archiving, indexing and retrieving images.

BACKGROUND OF THE INVENTION

The following U.S. Patents are believed to represent the current state of the art: U.S. Pat. Nos. 6,263,113 B1; 6,108,437; 6,035,074; 6,006,231; 5,978,507; 5,963,670; 5,915,038; 5,905,807; 5,896,462; 5,793,888; 5,764,790.

SUMMARY OF THE INVENTION

The present invention seeks to provide an improved system and methodology for archiving, indexing and retrieving images.

There is thus provided in accordance with a preferred embodiment of the present invention a method for indexing images of persons. The method includes providing image data relating to the images of persons to a suitably programmed computer, employing a first suitably programmed computer functionality to provide face recognition of the images, employing a second suitably programmed computer functionality to group the images according to faces recognized therein and employing a third suitably programmed computer functionality to provide an index of groups of the images organized according to faces recognized therein.

There is also provided in accordance with a preferred embodiment of the present invention a system for indexing images of persons. The system includes an image data source providing image data relating to the images of persons to a suitably programmed computer, a first suitably programmed computer functionality providing face recognition of the images, a second suitably programmed computer functionality grouping the images according to faces recognized therein and a third suitably programmed computer functionality providing an index of groups of the images organized according to faces recognized therein.

Further in accordance with a preferred embodiment of the present invention the method also includes employing the index for retrieving, viewing and optionally downloading images of an individual person.

Still further in accordance with a preferred embodiment of the present invention at least two of the first, second and third suitably programmed computer functionalities are performed by the suitably programmed computer.

Additionally or alternatively, all of the first, second and third suitably programmed computer functionalities are performed by the suitably programmed computer.

Moreover in accordance with a preferred embodiment of the present invention the index employs a recognized face as an index icon.

Preferably, the steps of providing image data and retrieving, viewing and optionally downloading are carried out via the Internet.

Further in accordance with a preferred embodiment of the present invention the step of providing image data employs a film camera and a scanner.

Alternatively, the step of providing image data employs a digital camera.

Still further in accordance with a preferred embodiment of the present invention the index employs a recognized face as an index icon.

There is also provided in accordance with another preferred embodiment of the present invention a method for classifying images of persons in photographs. The method includes the steps of photographing a plurality of persons in a plurality of scenes, wherein not all of the persons appear in all of the scenes, to provide a plurality of photographs, computer analyzing the plurality of photographs to detect at least the faces of persons in each of the scenes and automatically grouping the photographs according to at least the faces of the persons appearing therein.

There is further provided in accordance with yet another preferred embodiment of the present invention a system for classifying images of persons in photographs. The system includes a photography subsystem photographing a plurality of persons in a plurality of scenes, wherein not all of the persons appear in all of the scenes, to provide a plurality of photographs and a computer analysis and photograph grouping subsystem for computer analyzing the plurality of photographs to detect at least the faces of persons in each of the scenes and automatically grouping the photographs according to at least the faces of the persons appearing therein.

Further in accordance with a preferred embodiment of the present invention the method for classifying images also includes indexing the plurality of photographs at least partially in accordance with the faces of the persons appearing therein.

Still further in accordance with a preferred embodiment of the present invention the step of photographing includes photographing the plurality of persons while they are bearing unique identification indications. The step of computer analyzing includes face recognition of the faces of the persons appearing in the photographs, recognition of the unique identification indications and correlation of the faces with the unique identification indications.

Additionally in accordance with a preferred embodiment of the present invention the step of computer analyzing includes image indication assisted face recognition.

Further in accordance with a preferred embodiment of the present invention the step of face recognition includes image indication assisted face recognition.

Moreover in accordance with a preferred embodiment of the present invention the step of grouping the photographs employs the step of correlating the faces with the unique identification indications.

Additionally in accordance with a preferred embodiment of the present invention the steps of grouping and indexing the photographs employs correlating the faces with the unique identification indications.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
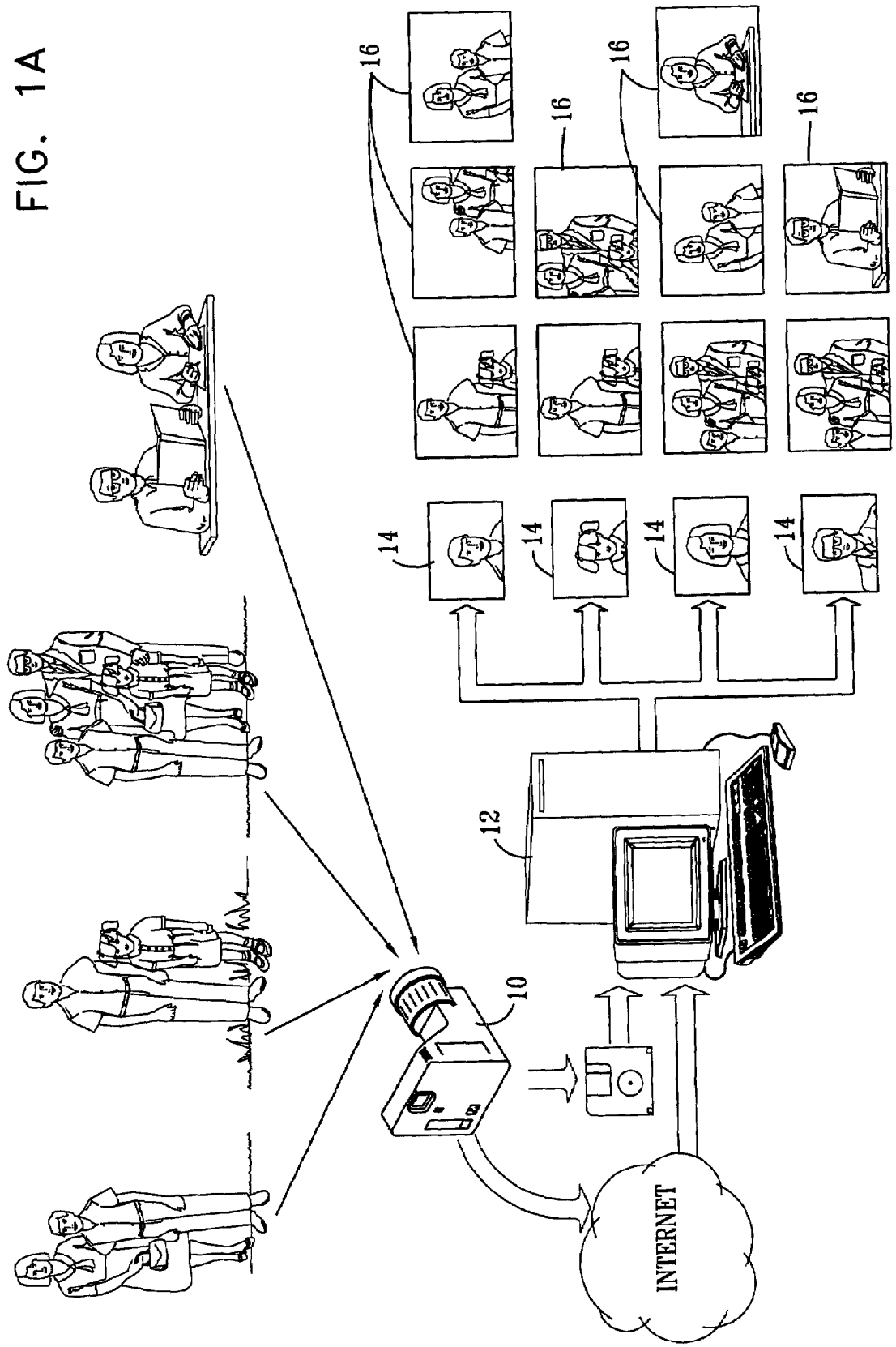
FIGS. 1A and 1B are simplified pictorial illustrations of a system and methodology for archiving images in accordance with two variations of a preferred embodiment of the present invention.
Figure 1B:
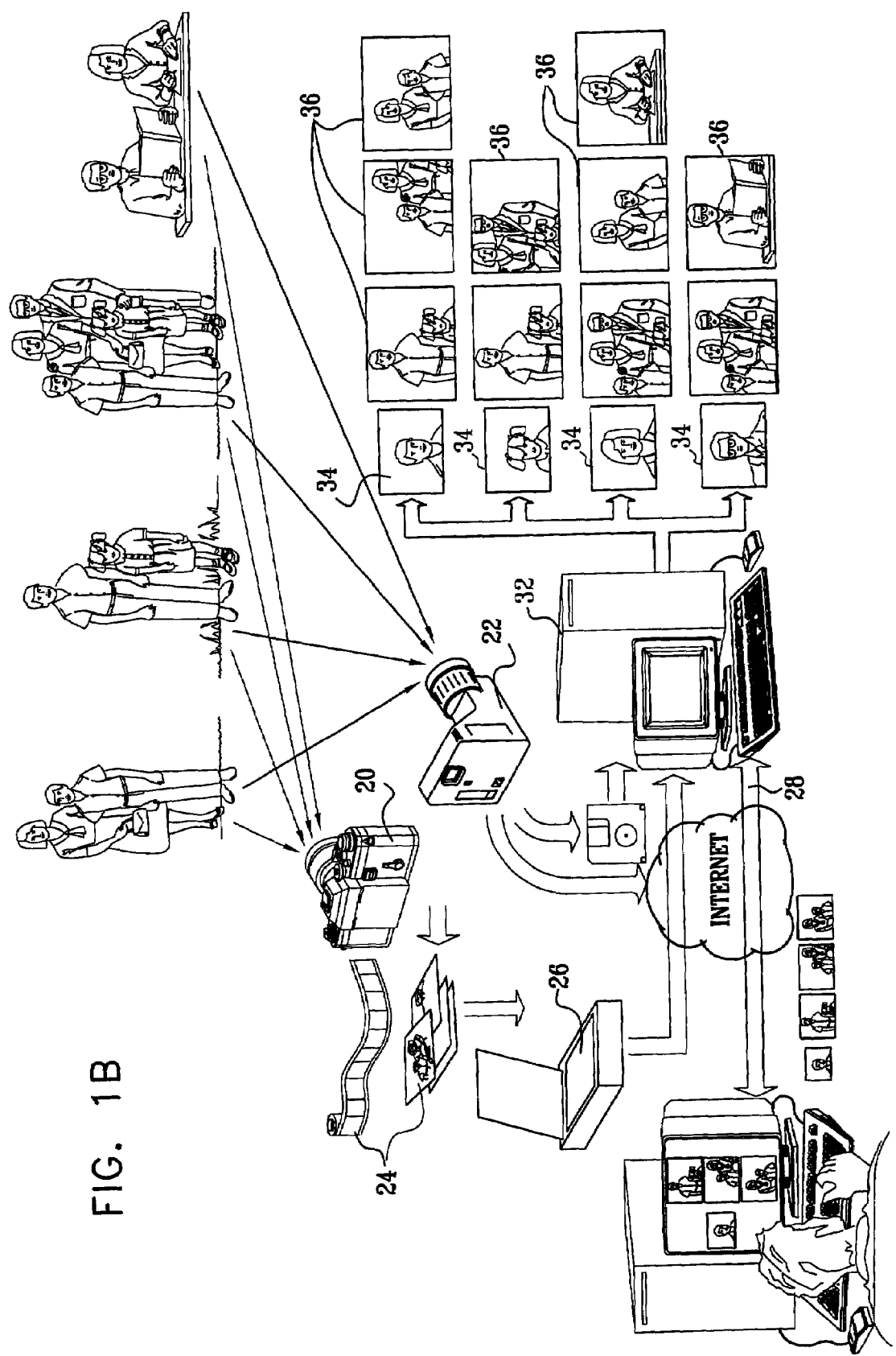

Reference is now made to FIGS. 1A and 1B, which are simplified pictorial illustrations of a system and methodology for archiving images in accordance with two variations of a preferred embodiment of the present invention.

As seen in FIG. 1A, scenes in which various persons are present are photographed in a plurality of settings and groupings. Not all of the persons appear in each scene. The photographs are provided, typically in electronic form, from a camera 10 to a suitably programmed computer 12, which is operative to index the photographs according to images of persons appearing therein. Transmission of image data to the computer 12 may be effected directly or via a computer network, such as the Internet, in any suitable manner. Thus, the computer 12 is operative typically to provide a thumbnail image 14 of each person photographed, which thumbnail may serve as an index icon for viewing the thumbnail images of all of the photographs 16 in which that person appears.

In accordance with a preferred embodiment of the present invention, the computer 12 carries out face recognition on the images of the persons in the various photographs and is operative to recognize the same people in different photographs notwithstanding certain changes in their visual appearance and orientation.

Turning to FIG. 1B it is seen that the scenes, in which various persons are present, are similarly photographed in a plurality of settings and groupings wherein not all of the persons appear in each scene. Either or both a conventional film camera 20 and a digital camera 22 may be employed. Where a conventional film camera is employed, the photographs or negatives 24 may be scanned by a scanner 26 in a conventional manner and the electronic output thereof may be provided to a suitably programmed computer 32. The output from digital camera 22 may be provided in electronic form to computer 32. Transmission of image data to the computer 32 may be effected directly or via a computer network 28, such as the Internet, in any suitable manner. Thus, the computer 32 is operative typically to provide a thumbnail image 34 of each person photographed, which thumbnail may serve as an index icon for viewing the thumbnail images of all of the photographs 36 in which that person appears.

As in the embodiment of FIG. 1A, computer 32 preferably carries out face recognition on the images of the people in the various photographs and is operative to recognize the same people in different photographs notwithstanding certain changes in their visual appearance and orientation.

It is to be appreciated that the present invention does not require that the computer 32 be located adjacent to either the scanner 26 or to the digital camera 22. A preferred embodiment of the invention employs communication over a computer network 28, such as the Internet, with a remote processing computer, such as computer 32, and retrieving and viewing of the index of the icon images 34 and retrieving and viewing groups of thumbnail images 36 for each icon and optionally downloading the complete photograph of one or more of the thumbnail images 36 from the computer 32, over the Internet to a plurality of users. This preferred Internet embodiment is also applicable to the embodiment of FIG. 1A.

Figure 2A:
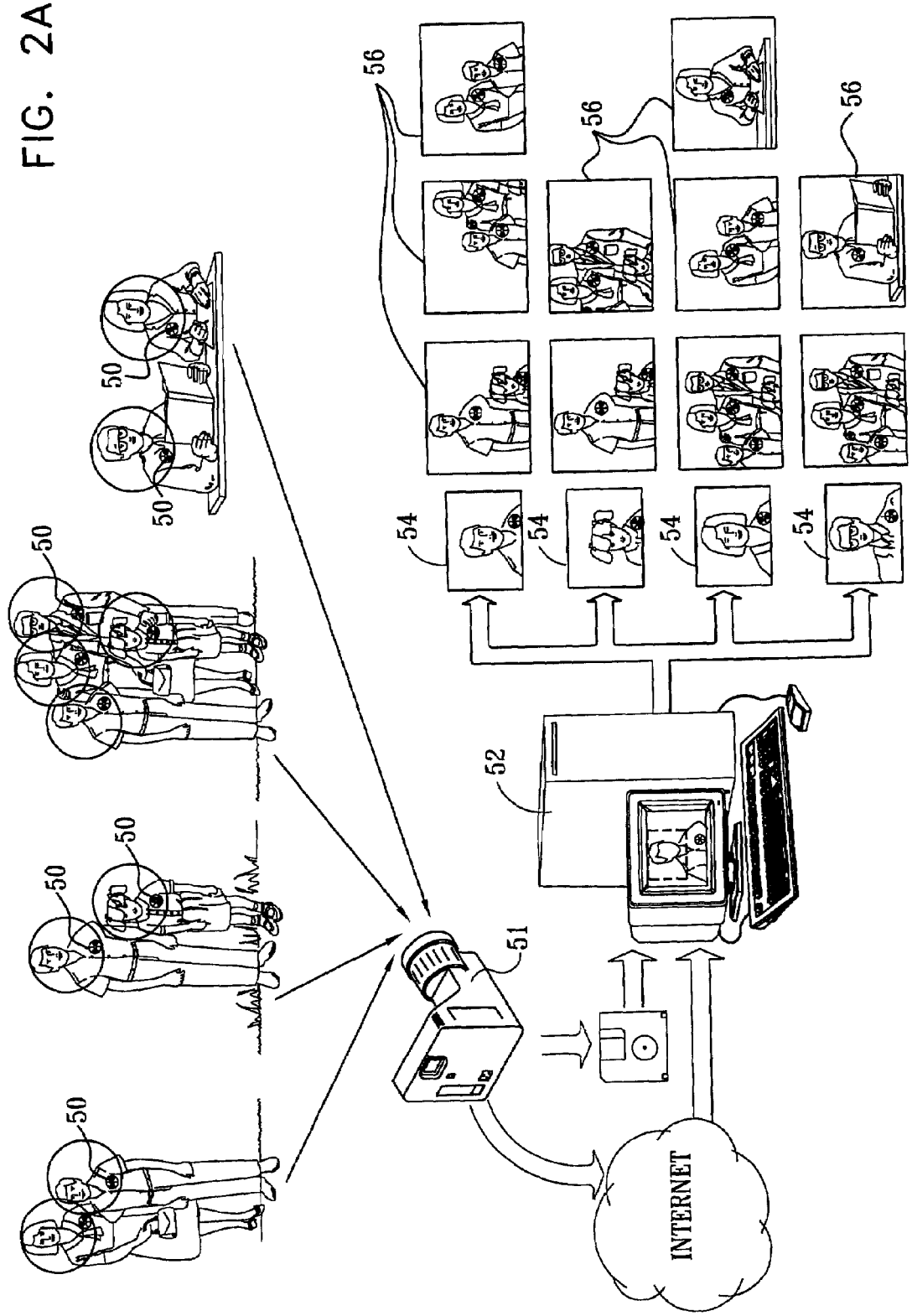
FIGS. 2A and 2B are simplified pictorial illustrations of a system and methodology for archiving images in accordance with two variations of another preferred embodiment of the present invention.
Figure 2B:
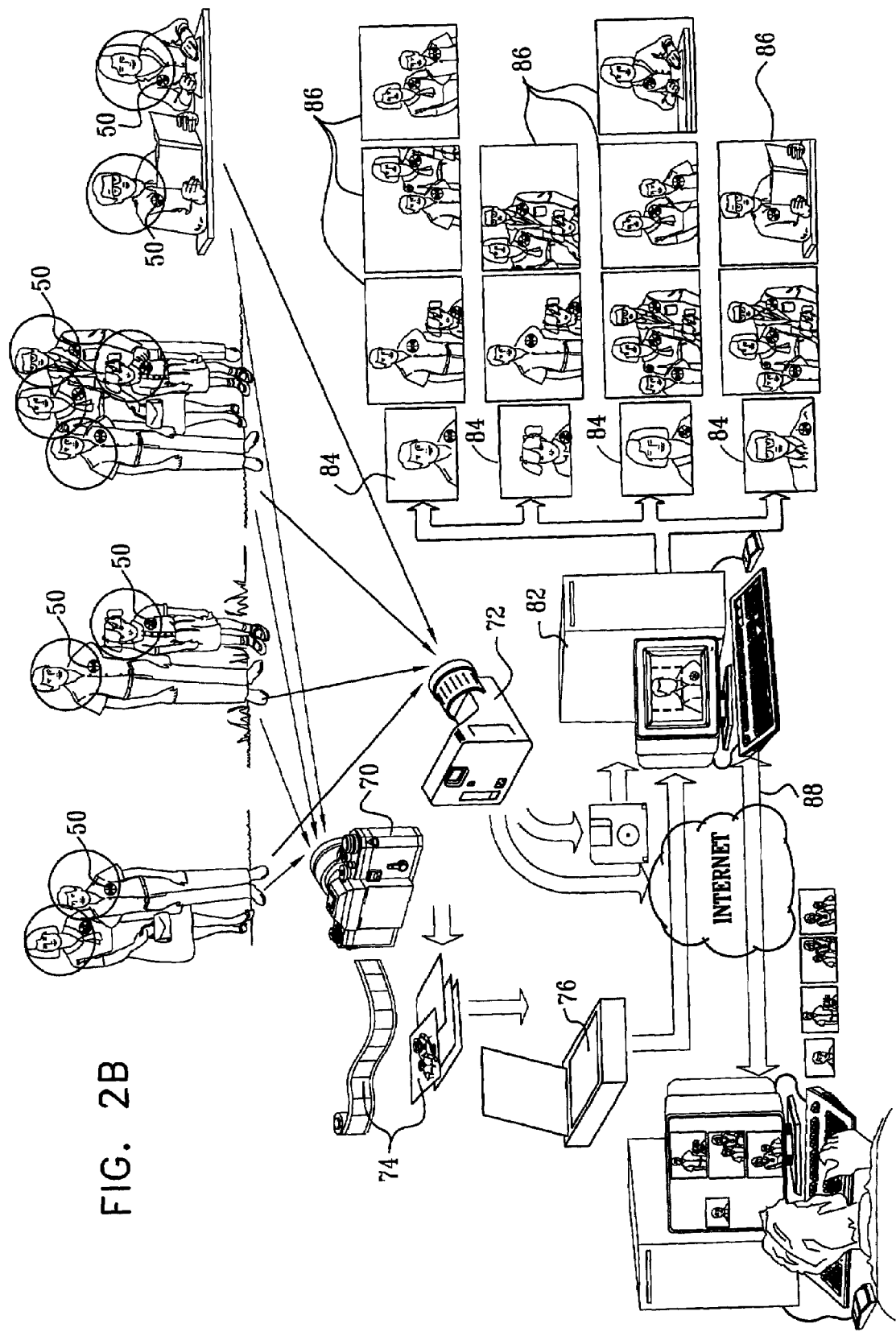

Reference is now made to FIGS. 2A and 2B, which are simplified pictorial illustrations of a system and methodology for archiving images in accordance with two variations of another preferred embodiment of the present invention.

As seen in FIG. 2A, similarly to that shown in FIGS. 1A and 1B, scenes in which various persons are present are photographed in a plurality of settings and groupings wherein not all of the persons appear in each scene.

In distinction to that shown in FIGS. 1A and 1B, each person in each scene preferably wears an identification indication 50 on the upper part of his body. This identification indication is preferably a multi-color, color coded identification indication commercially available from ImageID Inc. of One Penn Plaza, New York, N.Y. under the VIVIDOT trademark. A preferred embodiment of the identification indication is described in applicant/assignee's U.S. patent application Ser. No. 09/508,300, filed Mar. 9, 2000 and entitled "Image Identification and Delivery System", the disclosure of which is hereby incorporated by reference and appears in Published PCT Patent Application WO 00/04711, the disclosure of which is hereby incorporated by reference. The identification indication 50 worn by each person is unique and visually distinguishable from the identification indication 50 worn by each other person.

As in the embodiments of FIGS. 1A and 1B, the photographs are provided, typically in electronic form, from a camera 51 to a suitably programmed computer 52, which is operative to group the photographs according to each person appearing therein. In this embodiment, each person is distinguished from each other person, not only by the face of the person but also by the identification indication 50 worn by that person. The computer reads the identification indication 50 and typically derives a code sequence uniquely corresponding thereto. Similarly, the computer preferably employs a code sequence uniquely corresponding to each face in each photograph. Thus, it is appreciated that in the embodiment of FIGS. 2A and 2B, the computer preferably employs image data taken from the photographs to key each face to a unique identification indication 50 and vice versa.

Thus, the computer 52 is operative, preferably by using not only face recognition but also recognition of the unique identification indications 50, to provide a thumbnail image 54 of each person photographed, which thumbnail may serve as an icon for viewing the thumbnail images of all of the photographs 56 in which that person appears. Transmission of image data to the computer 52 may be effected directly or via a computer network, such as the Internet, in any suitable manner.

By virtue of the face recognition carried out by the computer 52 on the images of the people in the various photographs and by virtue of the recognition of the unique identification indications, the computer is provided with an enhanced ability to recognize the same people in different photographs notwithstanding certain changes in their visual appearance and orientation. Thus, even if only one of the face and the identification indication is recognizable in a photograph, the photograph can nevertheless be indexed.

It is also a particular feature of the embodiment of FIG. 2A that the suitably programmed computer 52 carries out face recognition with the assistance of the identification indication 50. Preferably, the computer 52 recognizes each identification indication 50 and identifies its location as the upper part of a human body. The computer 52 then looks for a face at a location generally above and adjacent to the upper part of the human body. This identification indication aided face recognition enables enhanced ease, speed and accuracy of face recognition. Thus, the computer 52 is operative typically to provide an index icon 54 for viewing all of the groups of thumbnail images 56 in which that person appears. The viewer may optionally download the complete photograph of a thumbnail image by double clicking on the thumbnail image 56.

Turning to FIG. 2B, it is seen that the scenes in which various persons are present are similarly photographed in a plurality of settings and groupings wherein not all of the persons appear in each scene. Either or both a conventional film camera 70 and a digital camera 72 may be employed. Where a conventional film camera is employed, the photographs or negatives 74 may be scanned by a scanner 76 in a conventional manner and the electronic output thereof may be provided to a suitably programmed computer 82. The output from digital camera 72 may be provided in electronic form to computer 82. Transmission of image data to the computer 82 may be effected directly or via a computer network 88, such as the Internet, in any suitable manner.

As in the embodiment of FIG. 2A, computer 82 carries out image indication assisted face recognition on the images of the people in the various photographs and is operative to recognize the same people in different photographs notwithstanding certain changes in their visual appearance and orientation.

It is to be appreciated that the present invention does not require that the computer 82 be located adjacent to either the scanner 76 or to the digital camera 72. A preferred embodiment of the invention employs communication over a computer network 88, such as the Internet, with a remote processing computer, such as computer 82, and retrieving and viewing of the index icons 84. The user may then retrieve and view groups of the thumbnail images 86 for each icon and optionally download a complete photograph of one or more of the thumbnail images 86 from the computer 82, over the Internet, to a plurality of users. This preferred Internet embodiment is also applicable to the embodiment of FIG. 2A.

Figure 3:
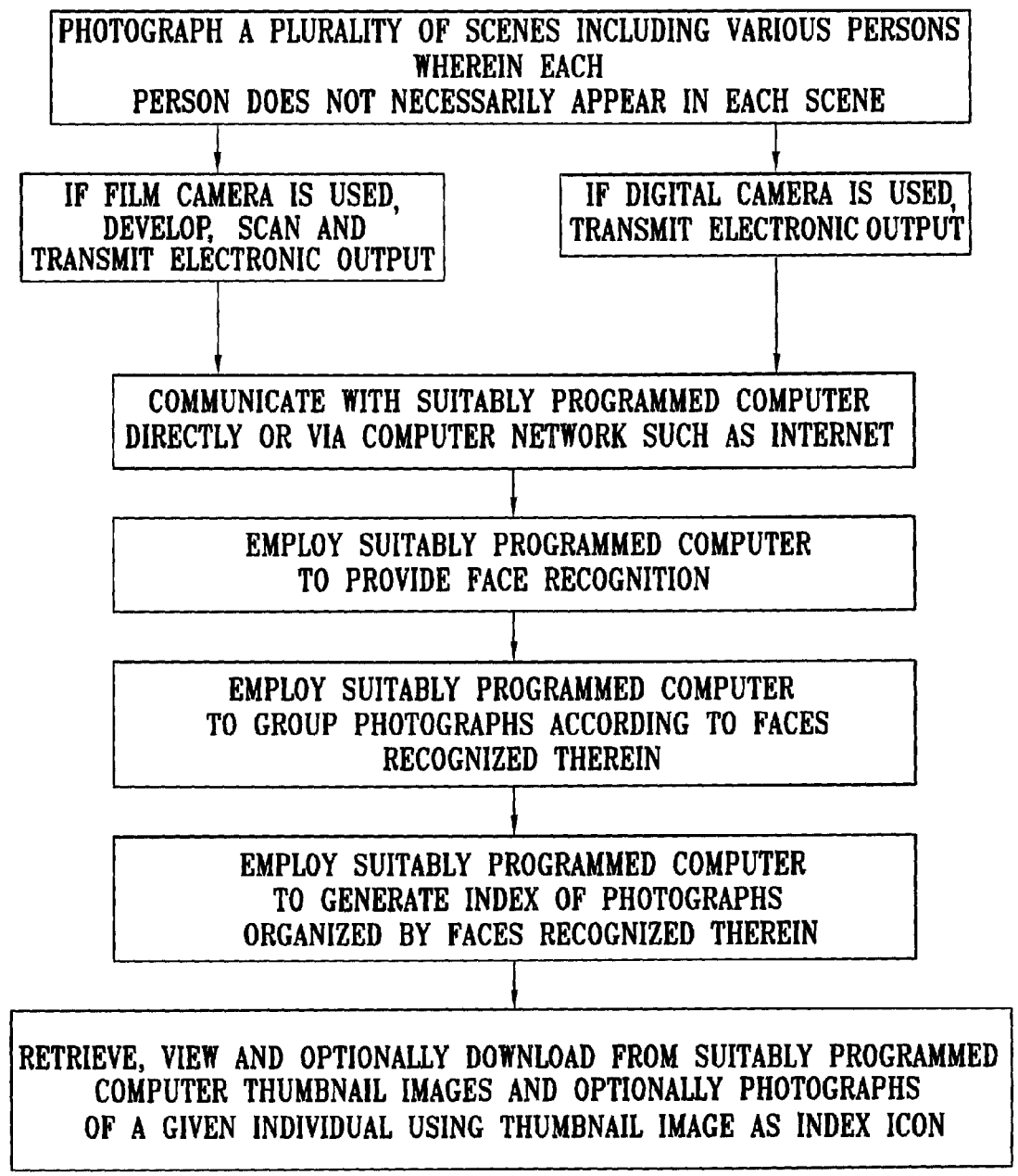
FIG. 3 is a simplified flowchart illustrating the functionality of the embodiment of FIGS. 1A and 1B.

Reference is now made to FIG. 3, which is a simplified flowchart illustrating the functionality of the embodiment of FIGS. 1A and 1B. As seen in FIG. 3, a plurality of scenes are photographed. Each scene typically includes one or more persons. Typically, each person photographed in a scene does not appear in all of the photographs.

If a film camera is employed, the film is developed and may be printed. Either the negatives or the prints are scanned using a conventional scanner. If a digital camera is employed, the electronic output thereof is downloaded from the camera using any suitable technique or media.

The resulting image content in electronic form may be supplied to a suitably programmed computer in any suitable manner. The computer may be any suitable computer. In accordance with a preferred embodiment of the present invention, the image content may be transmitted to a remote computer via the Internet.

The suitably programmed computer preferably is programmed with face recognition software. Such software may be entirely conventional. Examples of commercially available software for this purpose include:

FACEIT R software, commercially available from Visionics Corporation of 5600 Rowland Road, Minnetonka, Minn. 55343 U.S.A. and TrueFace software, commercially available from eTrue, Inc. of 144 Turnpike Road, Suite 100, Southboro, Mass. 01772 U.S.A.

Upon achievement of face recognition of faces of persons in the various images represented by the image content, the same computer or another suitably programmed computer is employed to group photographs according to the persons whose faces are recognized therein. Each such group of photographs is preferably indexed. A preferred image icon is a thumbnail image of the face of each person appearing in one or more photographs.

Preferred functionality for carrying out the face recognition-based grouping and indexing functionalities described in the preceding paragraph is described hereinbelow with reference to FIG. 5.

Once an index of photographs organized by the face recognized therein has been generated, it may be retrieved and viewed by any authorized user. The group of thumbnail images associated with each index icon may be retrieved and viewed by any authorized user by preferably clicking on an index icon, which may advantageously be a thumbnail image of a recognized face.

Figure 4:
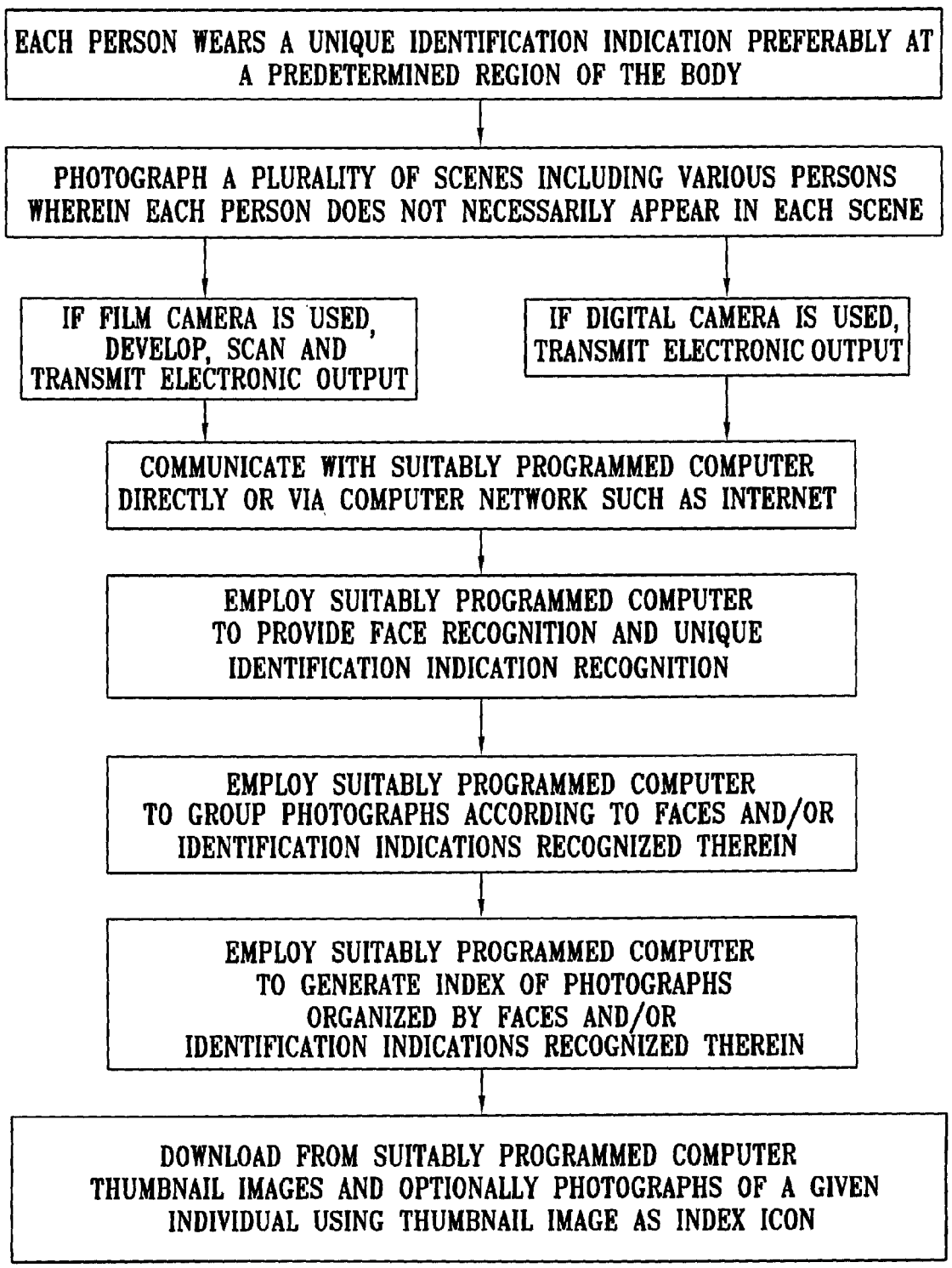
FIG. 4 is a simplified flowchart illustrating the functionality of the embodiment of FIGS. 2A and 2B.

Reference is now made to FIG. 4, which is a simplified flowchart illustrating the functionality of the embodiment of FIGS. 2A and 2B. As seen in FIG. 4, a plurality of scenes are photographed. Each scene typically includes one or more persons. Typically, each person photographed in a scene does not appear in all of the photographs.

In distinction to that described hereinabove with reference to FIG. 3, each person in each scene preferably wears a unique identification indication on his body. If a film camera is employed, the film is developed and may be printed. Either the negatives or the prints are scanned using a conventional scanner. If a digital camera is employed, the electronic output thereof is downloaded from the camera using any suitable technique or media.

The resulting image content in electronic form may be supplied to a suitably programmed computer in any suitable manner. The computer may be any suitable computer. In accordance with a preferred embodiment of the present invention, the image content may be transmitted to a remote computer via the Internet.

The suitably programmed computer preferably is programmed with identification indication recognition software, which is available for license on commercial terms from ImageID Inc. Once an identification indication has been recognized, the suitably programmed computer employs the location of the identification indication as a directional cue to assist in face recognition.

Preferred functionality for carrying out image indication assisted face recognition is described hereinbelow with reference to FIG. 6.

Preferably once both a face and a corresponding unique identification indication have been recognized, they are keyed together and both employed for identifying a given person in a photograph.

Upon achievement of face recognition of faces and unique identification indications of persons in the various images represented by the image content, the same computer or another suitably programmed computer is employed to group photographs according to the persons at least one of whose faces and identification images are recognized therein. Each such group of photographs is preferably indexed. A preferred image icon is a thumbnail image of the face of each person appearing in one or more photographs.

Preferred functionality for carrying out the face recognition-based grouping and indexing functionalities described in the preceding paragraph is described hereinbelow with reference to FIG. 5.

Once an index of photographs organized by the face recognized therein has been generated, it may be retrieved and viewed by any authorized user. The group of thumbnail images associated with each index icon may be retrieved and viewed by any authorized user by preferably clicking on an index icon for viewing all of the groups of the thumbnail images in which that person appears. The viewer may optionally download a complete picture of a thumbnail image by double clicking on the thumbnail image.

Figure 5:
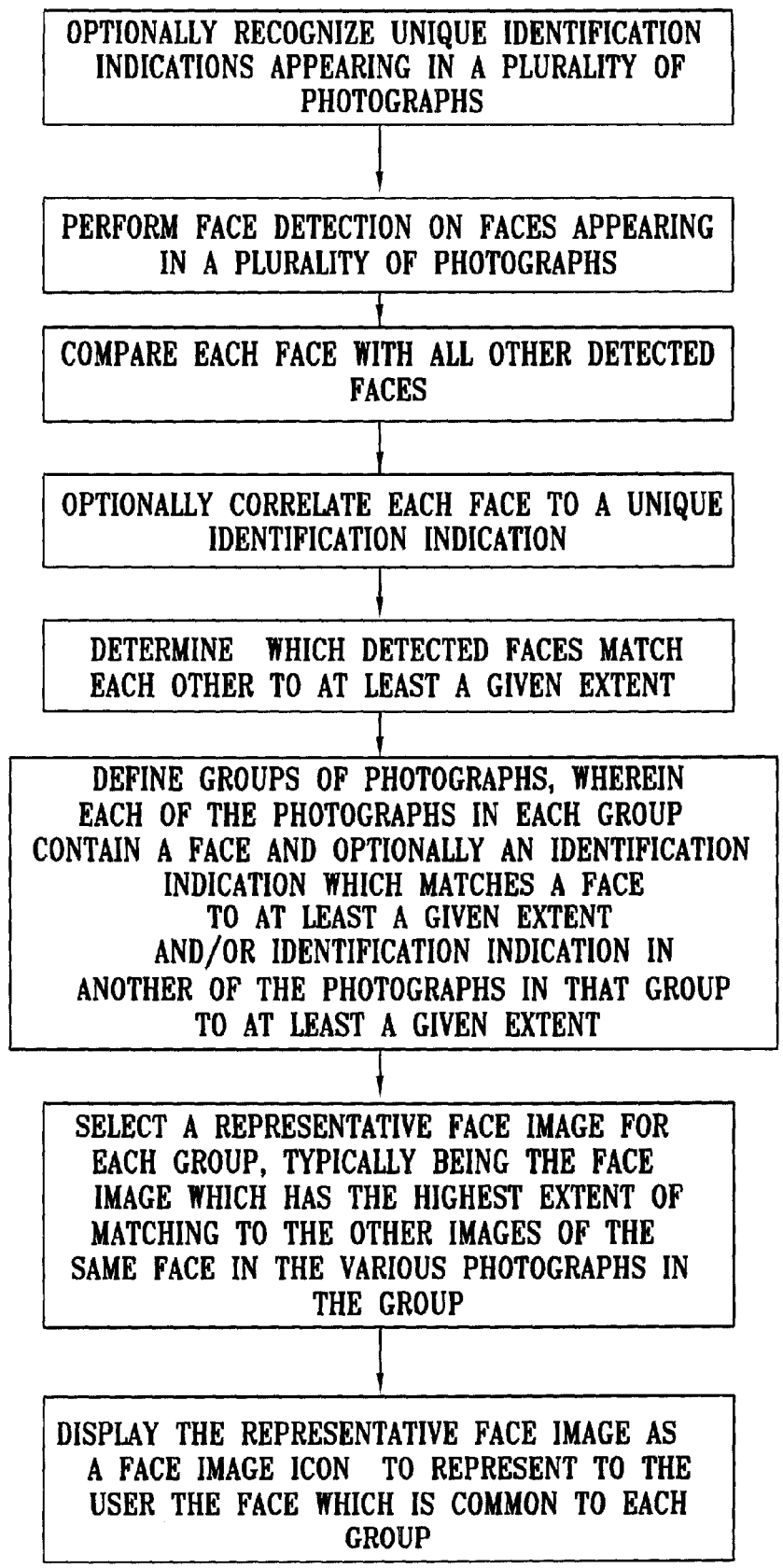
FIG. 5 is a simplified flowchart illustrating photograph grouping and indexing functionality employed in accordance with a preferred embodiment of the present invention.

Reference is now made to FIG. 5, which is a simplified flowchart illustrating photograph grouping and indexing functionality employed in accordance with a preferred embodiment of the present invention.

As seen in FIG. 5, face detection is preferably performed on all faces appearing in a plurality of photographs to be grouped, using any suitable face detection software, such as, for example:

FACEIT R software, commercially available from Visionics Corporation of 5600 Rowland Road, Minnetonka, Minn. 55343 U.S.A. and TrueFace software, commercially available from eTrue, Inc. of 144 Turnpike Road, Suite 100, Southboro, Mass. 01772 U.S.A.

Preferably, each detected face is compared with all other detected faces in order to determine which detected faces match each other to at least a predetermined extent. Additionally a similar functionality is preferably carried out with recognized identification indications in order to determine which detected identification indications match each other. Photographs each containing an image of what appears to be the same face and or an image of an identification indication corresponding to that face are grouped together. It is appreciated that within each group, the various images of the "same face" may resemble each other to a greater or lesser extent and in some cases, images of the "same face" may not resemble each other. It is preferably a condition for a photograph belonging to a group that the image of a face in the photograph resembles most of the images of the face in the other photographs in the group to at least a given extent.

An image index icon is selected to be a representative face image for each group. Typically it is the face image which has the highest extent of matching to the other images of the same face in the various photographs in the group. The image index icon is displayed to a user to represent to the user, the face which is common to each group and thus to indicate the identity of the person who is pictured in each of the photographs in the group.

Figure 6:
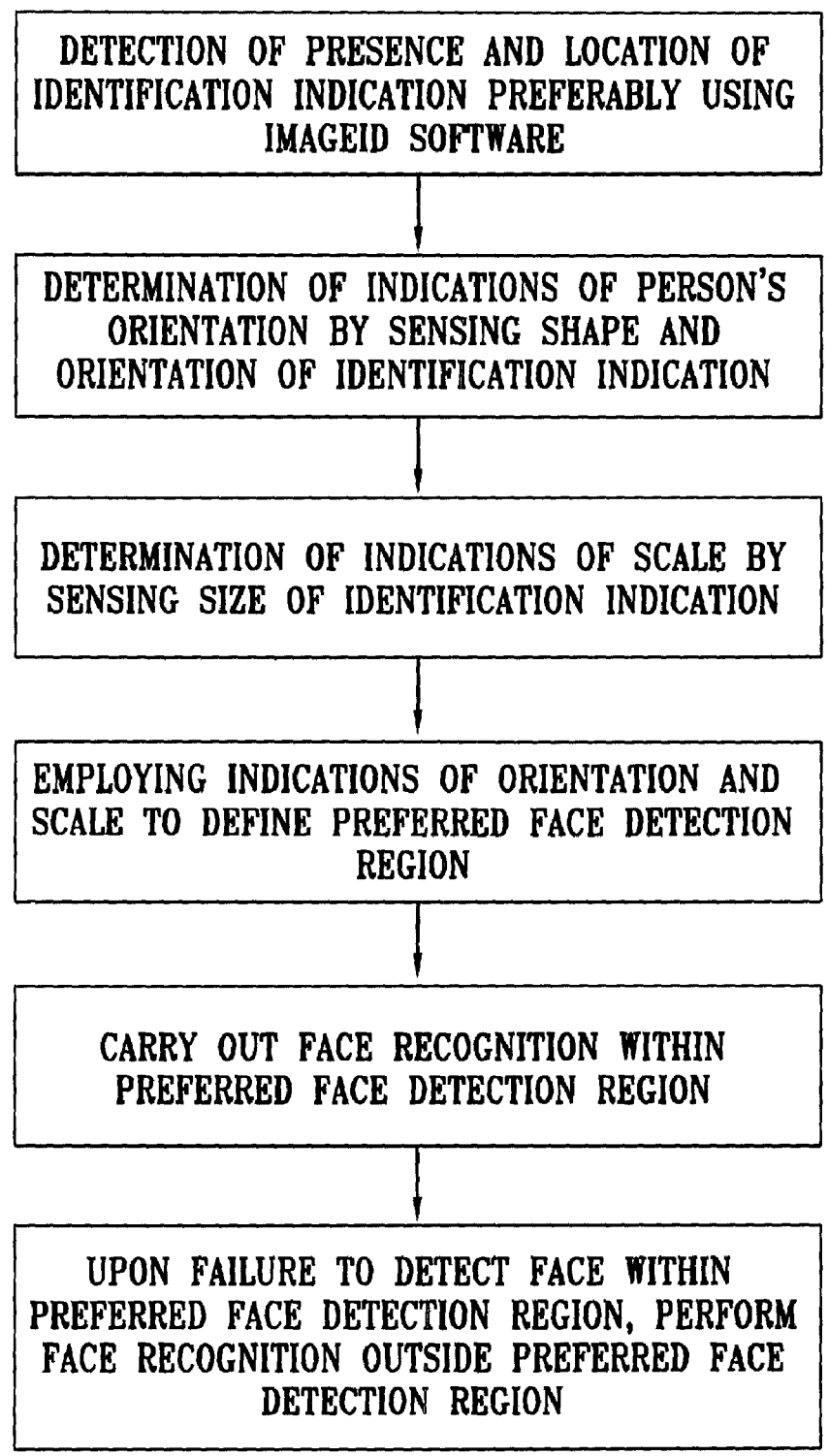
FIG. 6 is a simplified flowchart illustrating image indication assisted face recognition functionality employed in accordance with a preferred embodiment of the present invention.

Reference is now made to FIG. 6, which is a simplified flowchart illustrating image indication assisted face recognition functionality employed in accordance with a preferred embodiment of the present invention. As seen in FIG. 6, image indication assisted face recognition is preferably carried out by initially detecting the presence and location of an identification indication, preferably a VIVIDOT™ identification indication, using software commercially available from ImageID Inc.

Once the location of the identification indication is detected, the shape and orientation of the identification indication may be sensed to provide an indication of a person's orientation relative to the camera. The size of the identification indication provides an indication of scale.

The indications of orientation and scale are employed to define a preferred face detection region. Typically the relative width of this region is a positive function of the relative width of the identification indication. The preferred face detection region is preferably located above the location of the identification indication and is spaced therefrom, typically by a distance which is about one order of magnitude greater than the size of the identification indication.

Face recognition is carried out within the preferred face detection region, preferably using any suitable face detection software, such as, for example:

FACEIT R software, commercially available from Visionics Corporation of 5600 Rowland Road, Minnetonka, Minn. 55343 U.S.A. and TrueFace software, commercially available from eTrue, Inc. of 144 Turnpike Road, Suite 100, Southboro, Mass. 01772 U.S.A.

If face recognition is not successful with the preferred face detection region, it is preferably carried out also outside of the preferred face detection region.

It will be appreciated by persons skilled in the art that the present invention is not limited by what has been particularly shown and described hereinabove. Rather the scope of the present invention includes both combinations and subcombinations of the various features described hereinabove as well as variations and modifications which would occur to persons skilled in the art upon reading the specification and which are not in the prior art.

The invention claimed is:

1. A method comprising:
   using information from each image, detecting the location and identification of each face in a group of still images;
   identifying generally all sub-images in said group of still images which are recognizable as faces; and
   indexing said group of still images according to said sub-images.

2. The method according to claim 1 and also comprising employing an index generated by said indexing to retrieve images of an individual person.

3. The method according to claim 2 and wherein said employing is carried out via the Internet.

4. The method according to claim 2 and also comprising downloading at least one image.

5. The method according to claim 1 and comprising using said sub-images as index icons.

6. The method according to claim 1 and also comprising providing said group of images via the Internet.

7. The method according to claim 1 and also comprising providing image data with a film camera and a scanner.

8. The method according to claim 1 and also comprising providing image data from a digital camera.

9. A system comprising:
   a face recognition unit to detect the location and identification of each face in a group of still images from information in each image and to recognize generally all sub-images which are recognizable as faces in a group of still images; and
   an indexer to index each said group of still images according to said sub-images.

10. The system according to claim 9 and also comprising an image retriever to retrieve images of an individual person from an index generated by said indexer.

11. The system according to claim 10 and wherein said index comprises icon means to employ a recognized face as an index icon.

12. The system according to claim 10 and wherein said image retriever comprises a downloader for downloading at least one image.

13. The system according to claim 9 and also comprising a receiver to receive image data via the Internet.

14. The system according to claim 13 and wherein said receiver is connectable to a scanner scanning images from film.

15. The system according to claim 13 and wherein said receiver is connectable to a digital camera.

16. A method comprising:
   receiving a plurality of photographs of a multiplicity of persons in a plurality of scenes, wherein not all of the persons appear in all of the scenes;
   analyzing said plurality of photographs to detect and identify, from information in said photographs, generally all faces of said persons in each of the scenes; and
   grouping the photographs according to at least the faces of the persons appearing therein.

17. The method according to claim 16 and also comprising indexing said plurality of photographs at least partially in accordance with the faces of the persons appearing therein.

18. The method according to claim 16 and wherein said photographs include unique identification indications on said multiplicity of persons and said analyzing comprises:
   recognizing the faces of the persons appearing in said photographs;
   recognizing said unique identification indications; and
   correlating said faces with said unique identification indications.

19. The method according to claim 16 and wherein said analyzing comprises image indication assisted face recognition.

20. A system comprising:
   an image receiver to receive a plurality of photographs of a plurality of persons in a plurality of scenes, wherein not all of the persons appear in all of the scenes; and
   an analyzer to analyze said plurality of photographs to detect and identify, from information in said photographs, generally all faces of said persons in each of the scenes and to group the photographs according at least to the faces of the persons appearing therein.

21. The system according to claim 20 and wherein said analyzer also comprises an indexer to index said plurality of photographs at least partially in accordance with the faces of the persons appearing therein.

22. The system according to claim 20 and wherein said photographs include unique identification indications on said plurality of persons and said analyzer comprises:
   a face recognizer to recognize the faces of the persons appearing in said photographs;
   an indication recognizer to recognize said unique identification indications; and
   a correlator to correlate said faces with said unique identification indications.

23. The system according to claim 20 and wherein said analyzer comprises an image indication assisted face recognizer.

* * * * *

UNITED STATES PATENT AND TRADEMARK OFFICE
CERTIFICATE OF CORRECTION

PATENT NO.         : 7,203,367 B2                                       Page 1 of 1
APPLICATION NO. : 09/941503
DATED              : April 10, 2007
INVENTOR(S)        : Schniberg et al.

It is certified that error appears in the above-identified patent and that said Letters Patent is hereby corrected as shown below:

Claim 1, at column 8, line 34, should be corrected to change "each image" to "each still image".

Additionally, claim 6, at column 8, line 51, should be corrected to change "group of images" to "group of still images".

Further, claim 9, at column 8, line 59, should be corrected to change "each image" to "each still image".

Moreover, claim 9, at column 8, line 62, should be corrected to change "each said group" to "said group".

Signed and Sealed this

Thirty-first Day of March, 2009

JOHN DOLL
*Acting Director of the United States Patent and Trademark Office*